United States Patent [19]

Matthias et al.

[11] Patent Number: 5,590,728
[45] Date of Patent: Jan. 7, 1997

[54] ELEMENTS FACED WITH SUPERHARD MATERIAL

[75] Inventors: Terry R. Matthias, Longlevens; Nigel D. Griffin, Whitminster; John M. Fuller, Nailsworth, all of England

[73] Assignee: Camco Drilling Group Limited, Stonehouse, England

[21] Appl. No.: 337,663

[22] Filed: Nov. 9, 1994

[30] Foreign Application Priority Data

Nov. 10, 1993 [GB] United Kingdom .................. 9323207
Jun. 18, 1994 [GB] United Kingdom .................. 9412267

[51] Int. Cl.⁶ .................................................. E21B 10/46
[52] U.S. Cl. .......................... 175/432; 76/108.4; 175/434; 407/118; 407/119
[58] Field of Search .................................. 175/428, 426, 175/434, 432, 433, 430; 407/118, 119; 76/108.2, 108.4

[56] References Cited

U.S. PATENT DOCUMENTS

| 2,371,489 | 3/1945 | Williams, Jr. ........................ 175/434 |
| 4,109,737 | 8/1978 | Bovenkerk . |
| 4,629,373 | 12/1986 | Hall ...................................... 175/434 X |
| 4,861,350 | 8/1989 | Phaal et al. ......................... 175/426 X |
| 5,316,095 | 5/1994 | Tibbitts ............................... 175/434 X |
| 5,335,738 | 8/1994 | Waldenstrom et al. ................ 175/426 |
| 5,351,772 | 10/1994 | Smith ..................................... 175/428 |

FOREIGN PATENT DOCUMENTS 227506  8/1994  United Kingdom .

*Primary Examiner*—Stephen J. Novosad

[57] ABSTRACT

A preform element, such as a cutting element for a drag-type drill bit, includes a facing table of superhard material having a front face, a peripheral surface, and a rear surface bonded to a substrate which is less hard than the superhard material. The rear surface of the facing table is integrally formed with a plurality of ribs which project into the substrate and extend in directions outwardly away from an inner area of the facing table towards the peripheral surface thereof.

37 Claims, 6 Drawing Sheets 5,590,728

ELEMENTS FACED WITH SUPERHARD MATERIAL

BACKGROUND OF THE INVENTION

The invention relates to elements faced with superhard material, and particularly to preform elements comprising a facing table of superhard material having a front face, a peripheral surface, and a rear surface bonded to a substrate of material which is less hard than the superhard material.

Preform elements of this kind are often used as cutting elements on rotary drag-type drill bits, and the present invention will be particularly described in relation to such use. However, the invention is not restricted to cutting elements for this particular use, and may relate to preform elements for other purposes. For example, elements faced with superhard material, of the kind referred to, may also be employed in workpiece-shaping tools, high pressure nozzles, wire-drawing dies, bearings and other parts subject to sliding wear, as well as elements subject to percussive loads as may be the case in tappets, cams, cam followers, and similar devices in which a surface of high wear resistance is required.

Preform elements used as cutting elements in rotary drill bits usually have a facing table of polycrystalline diamond, although other superhard materials are available, such as cubic boron nitride. The substrate of less hard material is often formed from cemented tungsten carbide, and the facing table and substrate are bonded together during formation of the element in a high pressure, high temperature forming press. This forming process is well known and will not be described in detail.

Each preform cutting element may be mounted on a carrier in the form of a generally cylindrical stud or post received in a socket in the body of the drill bit. The carrier is often formed from cemented tungsten carbide, the surface of the substrate being brazed to a surface on the carrier, for example by a process known as "LS bonding". Alternatively, the substrate itself may be of sufficient thickness as to provide, in effect, a cylindrical stud which is sufficiently long to be directly received in a socket in the bit body, without being brazed to a carrier. The bit body itself may be machined from metal, usually steel, or may be moulded using a powder metallurgy process.

Such cutting elements are subjected to extremes of temperature during formation and mounting on the bit body, and are also subjected to high temperatures and heavy loads when the drill is in use down a borehole. It is found that as a result of such conditions spalling and delamination of the superhard facing table can occur, that is to say the separation and loss of the diamond or other superhard material over the cutting surface of the table.

This may also occur in preform elements used for other purposes, and particularly where the elements are subjected to repetitive percussive loads, as in tappets and cam mechanisms.

Commonly, in preform elements of the above type the interface between the superhard table and the substrate has usually been flat and planar. However, particularly in cutting elements for drill bits, attempts have been made to improve the bond between the superhard facing table and the substrate by configuring the rear face of the facing table so as to provide a degree of mechanical interlocking between the facing table and substrate.

One such arrangement is shown in U.S. Pat. No. 5,120, 327 where the rear surface of the facing table is integrally formed with a plurality of identical spaced apart parallel ridges of constant depth. The facing table also includes a peripheral ring of greater thickness, the extremities of the parallel ridges intersecting the surrounding ring. U.S. Pat. No. 4,784,023 illustrates a similar arrangement but without the peripheral ring.

While such cutting elements have met with some success in the field, they suffer from certain serious disadvantages. Since the ridges on the facing table are parallel and extend from one side of the cutting element to the other, it is necessary; to ensure that the cutting element is mounted on the drill bit in the correct rotational orientation, since it is desirable that the cutting edge, i.e. the part of the periphery of the facing table which engages the formation during drilling, extends across the ends of the ridges. This leads to difficulties, during manufacture, in mounting such cutting elements in the correct orientation on the posts, since many posts are not mounted on the bit body so as to be perpendicular to the formation. Thus the required orientation of the cutting element on the post depends upon the ultimate orientation and alignment of the post when mounted on the bit body.

One of the main purposes of providing the above-mentioned ridges on the facing table is to improve the bonding between the facing table and the substrate by accommodating the distortion which results from heating of the cutting assembly during manufacture, both during formation of the cutting element itself, and in its subsequent bonding onto a carrier. Such distortion results from the difference in coefficient of thermal expansion between the superhard material of the facing table and the less hard material of the substrate. Since the cutting elements of the kind referred to above are not symmetrical about the central axis, the distortion as a result of heating is also not symmetrical. Thus little distortion may be found along the plane of the ridges, but considerable distortion may be evident perpendicular to the ridges. This can therefore lead to splitting along the line of the ridges when the cutting element is subjected to high temperatures, for example when bonding to a carrier.

Given the difference in properties between the superhard material and the material of the substrate, a stress condition is always established between the facing table and the substrate. This stress is generally radial and the intensity of the stress increases with distance from the centre of the cutter. The prior art cutting elements take no account of this and provide no arrangement for accommodating the increasing stress at the outer radial positions. The opposite extremities of the parallel ridges provide some reinforcement of the outer peripheral ring on two diametrically opposed portions of the peripheral ring but provide no such support for the opposed portions of the ring which lie at opposite ends of a diameter at right angles to the ridges.

SUMMARY OF THE INVENTION

According to the present invention there is a preform element including a facing table of superhard material having a front face, a peripheral surface, and a rear surface bonded to a substrate which is less hard than the superhard material, the rear surface of the facing table being integrally formed with a plurality of ribs which project into the substrate and extend in directions outwardly away from an inner area of the facing table towards the peripheral surface thereof.

Each rib may be substantially continuous as it extends outwardly away from said inner area of the facing table. Alternatively, each rib may comprise a plurality of discrete projections formed on the rear surface of the facing table so as to project into the substrate, said projections being spaced apart along a line which extends outwardly away from said inner area of the facing table towards the peripheral surface thereof.

The term "rib" where used generically in this specification, therefore, is to be understood to include such a line of spaced projections, notwithstanding that a "rib" may conventionally be regarded as being continuous.

Said inner area of the facing table is preferably substantially free of ribs, and is preferably substantially flat.

In the case where said inner area of the facing table is substantially free of ribs, it may be a generally circular area within the facing table, said ribs extending outwardly from the periphery of the circular area. This inner area may be substantially coaxial with the facing table or may be offset with respect to the central axis of the facing table.

In any of the above arrangements the ribs may be spaced apart to form an array which extends around substantially the whole circumference of the facing table. Alternatively the array of ribs may extend around only a part of the circumference of the facing table.

The ribs may extend in generally radial directions, or each rib may be inclined at an angle to a radius of the facing table. For example, the ribs may be inclined at equal angles to correspondingly associated radii of the facing table.

The outer end of each rib, or of at least some of the ribs, may terminate at or adjacent the peripheral surface of the facing table, although in some cases ribs may terminate inwardly of said peripheral surface.

Part of the outer peripheral surface of the facing table may also be formed with a peripheral wall portion which projects rearwardly from the periphery of the facing table. In this case the outer ends of some or all of the aforesaid ribs may intersect the peripheral wall portion. The depth of each such rib, where it intersects the peripheral wall portion, may be greater than the depth of the wall portion. The peripheral wall portion may be generally rectangular in cross-section.

Some or all of the ribs may vary in depth along the length thereof. In the case where a rib comprises a line of spaced projections, the variation in depth of the rib along its length may be provided either by variation in the depth of one or more individual projections or, preferably, by different projections being of different depths.

Some or all of the ribs may increase in depth, for example linearly, as they extend away from the inner area of the facing table. The ribs may be of similar overall and/or maximum depth, or the depth may vary from one rib to another.

Similarly the ribs may be of similar lengths, or they may of different lengths. Also, the ribs may be of similar width (i.e. thickness) or they may be of different widths.

Each rib may be substantially parallel-sided, over at least a portion of its depth, as it extends away from the rear surface of the facing table. Alternatively, each rib may taper in width; for example it may taper outwardly as it extends outwardly away from said inner area of the facing table. The longitudinal edges of the ribs remote from the rear surface of the facing table may be rounded.

DETAILED DESCRIPTION OF THE PREFERRED EMBODIMENTS

Figure 1:
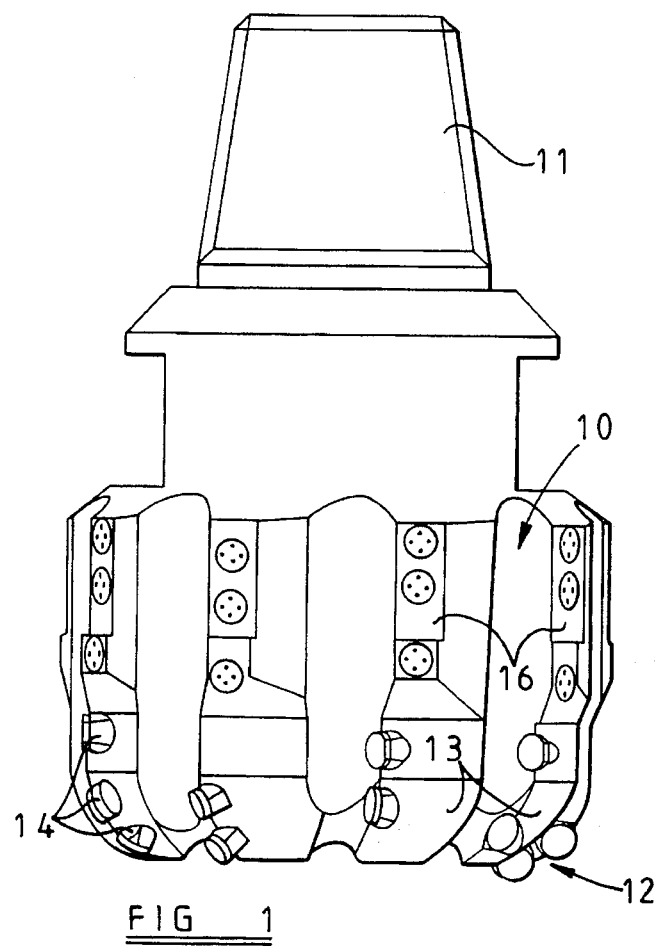
FIG. 1 is a side elevation of a typical drag-type drill bit in which cutting elements according to the present invention may be used.
Figure 2:
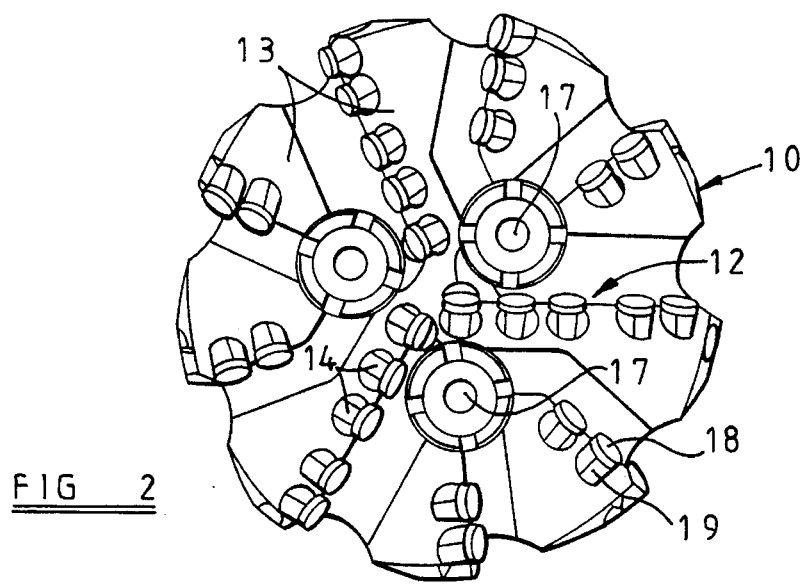
FIG. 2 is an end elevation of the drill bit shown in FIG. 1.

FIGS. 1 and 2 show a typical full bore drag-bit of a kind to which cutting elements of the present invention are applicable. The bit body 10 is machined from steel and has a shank formed with an externally threaded tapered pin 11 at one end for connection to the drill string. The operative end face 12 of the bit body is formed with a number of blades 13 radiating from the central area of the bit, and the blades carry cutter assemblies 14 spaced apart along the length thereof. The bit has a gauge section including kickers 16 which contact the walls of the borehole to stabilise the bit in the borehole. A central passage (not shown) in the bit and shank delivers drilling fluid through nozzles 17 in the end face 12 in known manner.

Each cutter assembly 14 comprises a preform curing element 18 mounted on a carder 19 in the form of a post which is located in a socket in the bit body. Each preform cutting element is in the form of a circular tablet comprising a facing table of superhard material, usually polycrystalline diamond, bonded to a substrate which is normally of cemented tungsten carbide. The rear surface of the substrate is bonded, for example by LS bonding, to a suitably orientated surface on the post 19.

Figure 3:
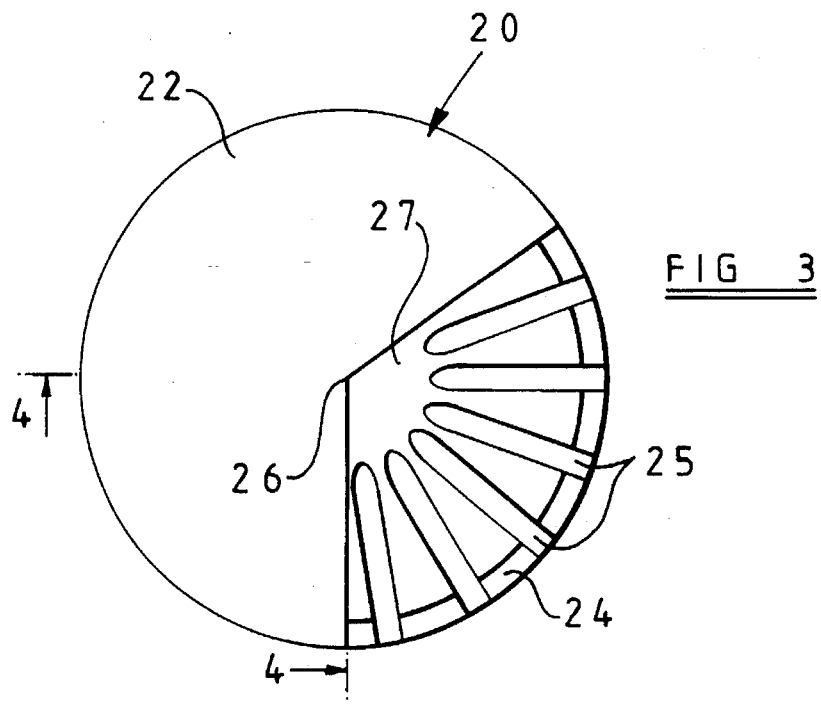
FIG. 3 is a plan view, on an enlarged scale, of a cutting element in accordance with the invention, the top layer of the cutting element being shown partly cut away.
Figure 4:
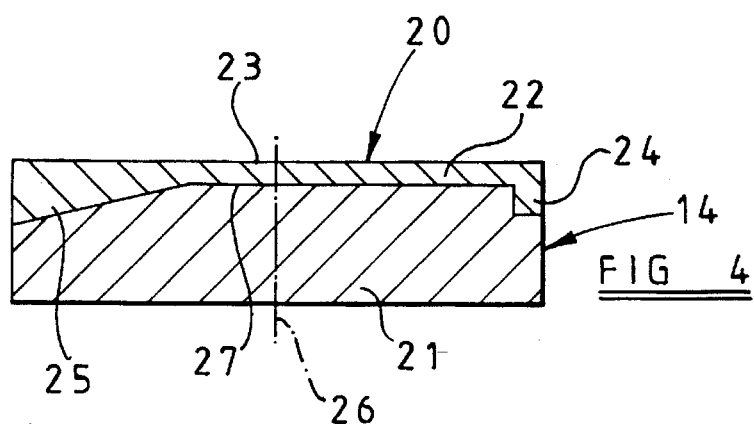
FIG. 4 is a section on the line 4—4 of FIG. 3.
Figure 5:
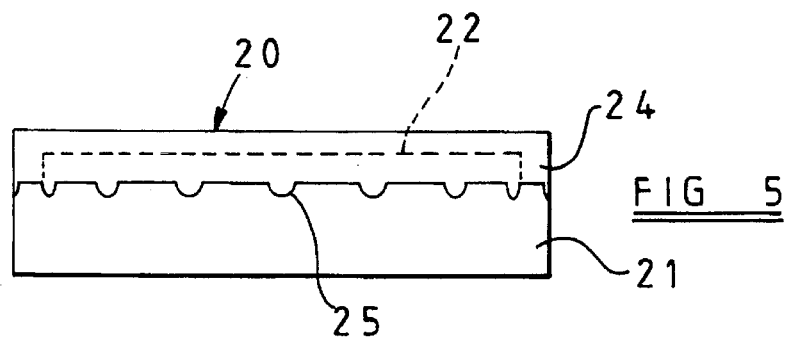
FIG. 5 is a side elevation of the cutting element of FIG. 3.

One form of cutting element in accordance with the present invention is shown in FIGS. 3 to 5. The cutting element comprises a polycrystalline diamond front facing table 20 bonded to a cemented tungsten carbide substrate 21. The facing table 20 comprises a front flat layer 22 which provides the front cutting face 23 of the facing table, and a peripheral wall 24 is integrally formed with the front layer 22 and extends rearwardly therefrom around the periphery of the cutting element.

Also integrally formed with the front layer 22 are a plurality of radially extending ribs 25 which project rearwardly from the front layer 22 and into the substrate 21.

As best seen in FIG. 3, the inner extremities of the ribs 25 are spaced outwardly from the central axis 26 of the front layer 22 so as to provide a circular central area 27 which is free of ribs and the rear surface of which is flat. The ribs 25 are, in this instance, of substantially constant width, opposite sides of the ribs being parallel as they extend away from the from layer 22. The rearward extremities of the ribs are rounded, as best seen in FIG. 5.

Each rib 25 increases linearly in depth as it extends outwardly away from the central axis of the cutting element, and the outer extremities of the ribs intersect the peripheral wall 24. The maximum depth of each rib 25, at its outer extremity, is greater than the depth of the peripheral wall 24 so that the outer extremities of the rib project beyond the peripheral wall as exposed at the outer surface of the cutting element, as may be seen from FIG. 5.

As previously explained, the provision of the ribs 25 serves to improve the bond between the facing table 20 and the substrate 21 while at the same time the radial orientation of the ribs reduces the risk of splitting or delamination due to a asymmetrical distortion, as well as allowing the cutting element to be positioned in any orientation on its carder or on the bit body.

The drawings show by way of example a cutting element in which the ribs 25 are all similar and are of constant width and length. However, the invention includes within its scope arrangements where ribs of different lengths are provided and where the inner and/or outer extremities of the ribs are located in different positions with respect to the central axis 26 of the element. The peripheral wall portion 24 may be omitted or may be of a different cross-sectional shape from that shown in the drawings. Ribs of different widths may be provided and the width of an individual rib may vary as it extends outwardly away from the central axis of the element. For example the width of a rib may increase as it extends away from the axis.

In the arrangement shown the ribs 25 are of similar shape and similar overall depth, the shape being as shown in FIG. 4. However, the invention includes arrangements in which ribs of different depths and differently varying depths are employed. As previously mentioned, by providing ribs of different depths which project to different extents into the material of the substrate, crack propagation across the substrate may be inhibited.

Figure 6:
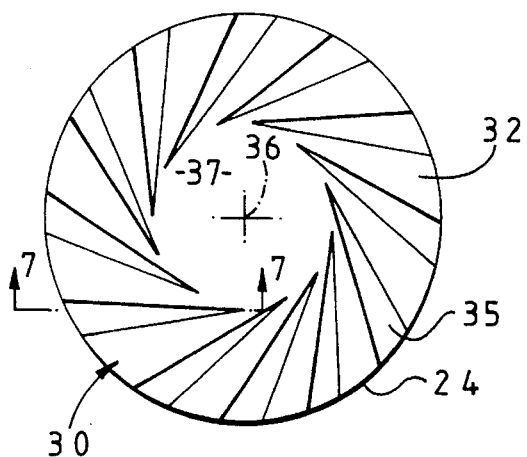
FIG. 6 is an underplan view, on an enlarged scale, of the superhard facing table of a preform element in accordance with the invention, the substrate, which would normally be bonded to the underside of the facing table, being removed to show the configuration of the ribs.
Figure 7:
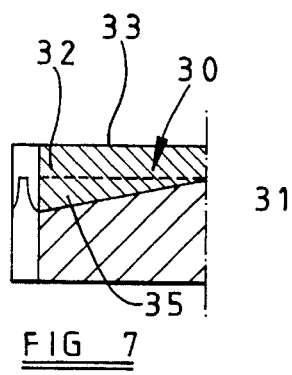
FIG. 7 is a section on the line 7—7 of FIG. 6, FIGS. 8 and 9 are similar views to FIGS. 6 and 7 of an alternative arrangement.

Another form of cutting element in accordance with the present invention is shown in FIGS. 6 and 7. The cutting element comprises a polycrystalline diamond front facing table 30 bonded to a cemented tungsten carbide substrate 31. The facing table 30 comprises a front flat layer 32 which provides the front cutting face 33 of the facing table, integrally formed with which are a plurality of ribs 35 which project rearwardly from the front layer 32 and into the substrate 31.

As best seen in FIG. 6, the inner extremities of the ribs 35 are spaced outwardly from the central axis 36 of the front layer 32 so as to provide a circular inner area 37 which is free of ribs and the rear surface of which is flat. Each rib 35 increases in width as it extends away from the inner area 37, and extends at an angle of about 30° to the radial direction.

As best seen in FIG. 7, each rib 35 increases linearly in depth as it extends outwardly away from the inner area 37 of the front layer 32.

In this arrangement, and in all of the arrangements to be described, the provision of the ribs 35 on the rear surface of the front layer serves to improve the bond between the facing table 30 and the substrate 31. In the arrangement shown the ribs 35 are symmetrically arranged with respect to the central axis 36 of the element and this reduces the risk of splitting or delamination due to asymmetrical distortion, as well as allowing the cutting element to be positioned in any orientation on its carder or on the bit body.

Figure 8:
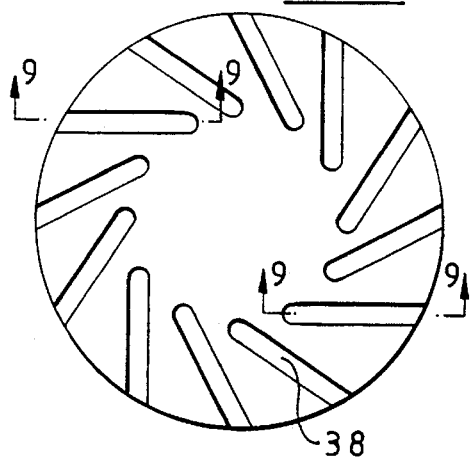
Figure 9:
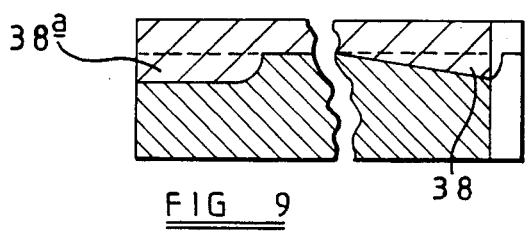

FIGS. 8 and 9 shows an alternative arrangement, somewhat similar to the arrangement of FIGS. 6 and 7, where the ribs 38 are of substantially constant width as they extend outwardly, the inner end of each rib being rounded. Each rib 38 may increase linearly in depth as it extends away from the inner area of the front layer, as shown on the fight hand side of FIG. 9. Alternatively, however, each rib might be of substantially constant depth, as indicated at 38a on the left hand side of FIG. 9.

FIGS. 10–29 are similar views to FIGS. 6 and 8 showing diagrammatically alternative configurations, according to the invention, for the ribs integrally formed on the rear surface of the front cutting table of a cutting element or other preform element. In each case the fibs may vary in depth as they extend outwardly from an inner area of the front table, for example they may increase linearly in depth as in the arrangement of FIGS. 6 and 7. However, in any of the arrangements to be described ribs of different depths and differently varying depths may be employed.

Figure 10:
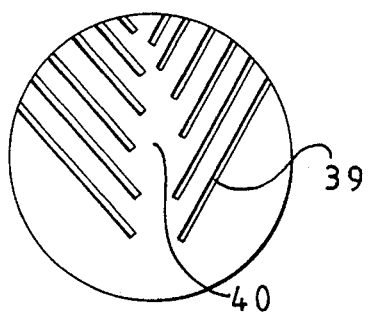
FIGS. 10–29 are similar views to FIGS. 6 and 8 of further alternative arrangements, some of which are shown only diagrammatically.

In the arrangement of FIG. 10 the ribs 39 extend outwardly from an elongate inner area 40 of the front table and comprise two sets of generally parallel ribs, the two sets being arranged at an angle to one another. In this arrangement the outer extremities of all the ribs 39 lie around one half of the peripheral surface of the element so that in this case the cutting element requires to be correctly orientated on the bit body depending on where the cutting edge is to be in relation to the ends of the ribs 39. Preferably the cutting edge extends across the end extremities of the ribs 39.

Figure 11:
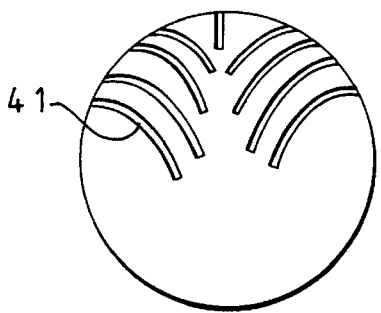

FIG. 11 shows a somewhat similar arrangement in which the ribs 41 are arcuate instead of being straight.

Figure 12:
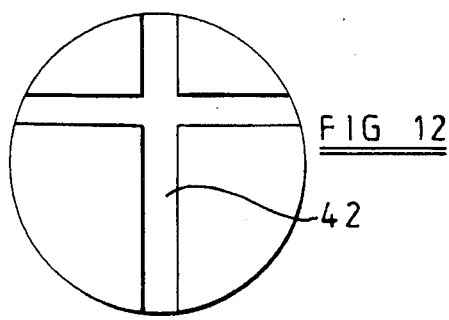

FIG. 12 shows an arrangement in which only four ribs 42 are provided, the ribs being arranged in a generally cruciform arrangement.

Figure 13:
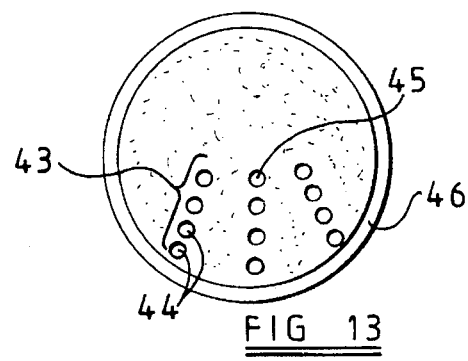

FIG. 13 shows an arrangement in which each rib 43 comprises a row of spaced circular projections 44. In this case only three such ribs are provided extending generally radially from an inner area 45 of the front table to a peripheral wall 46 which extends rearwardly from the front table around its periphery. The projections 44 may be of increasing depth as they extend away from the inner area 45 of the front table.

Figure 14:
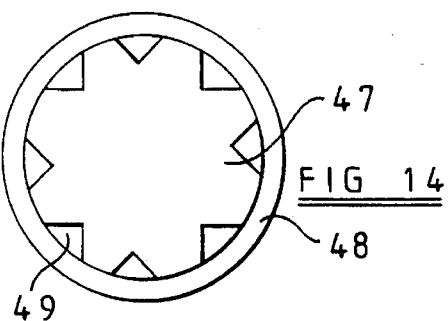

FIG. 14 shows a symmetrical arrangement where the front table 47 is formed with a peripheral wall 48 and a plurality of generally triangular ribs 49 are provided which extend only a short way radially inwardly from the peripheral wall 48. The ribs 49 may be arcuate as viewed in cross section and preferably increase in depth as they extend outwardly towards the peripheral wall 48. Preferably the maximum depth of the ribs 49 is greater than the depth of the peripheral wall 48.

Figure 15:
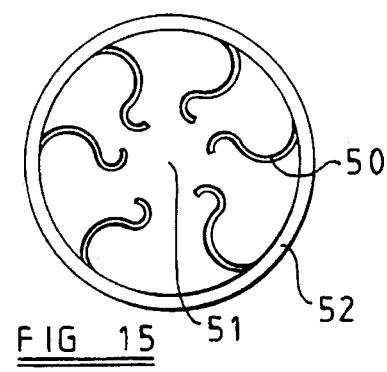

FIG. 15 shows another symmetrical arrangement in which a plurality of generally S-shaped ribs 50 extend outwardly from an inner area 51 of the front table to a peripheral wall 52.

Figure 16:
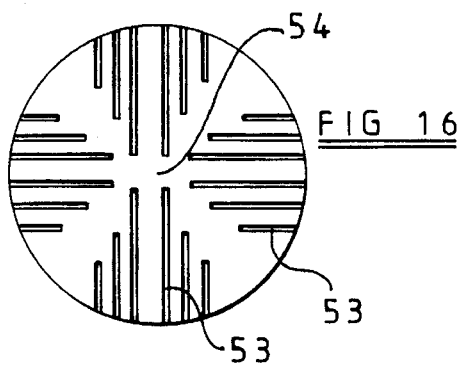

In FIG. 16 there are provided four sets of six ribs 53, the ribs extending parallel to two diameters respectively which are at right angles. As will be seen from FIG. 16 the outer ribs in each group of four are shorter than the inner ribs, but all ribs extend to the periphery of the front layer. All the ribs may increase in depth, for example linearly, as they extend outwardly away from the inner area 54 of the front layer.

Figure 17:
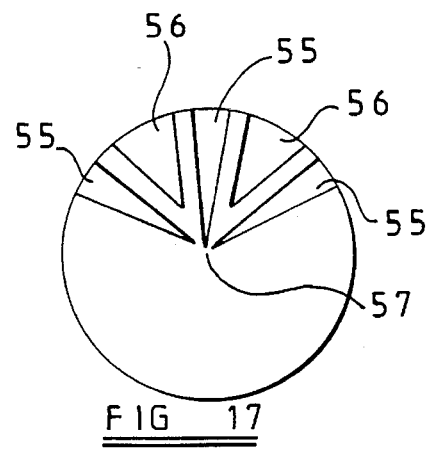

FIG. 17 shows a non-symmetrical arrangement in which three longer ribs 55 and two shorter ribs 56 extend outwardly from an inner area 57 of the front layer, each rib increasing in width as it extends outwardly to the periphery of the cutting element. In such an arrangement the cutting element will be orientated so that the cutting edge lies around the outer extremities of the ribs 55, 56.

Figure 18:
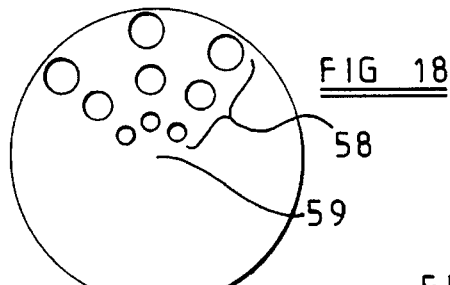
Figure 19:
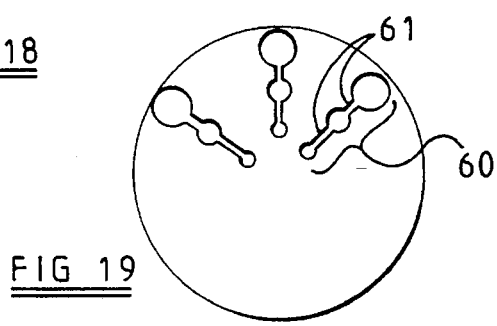
Figure 20:
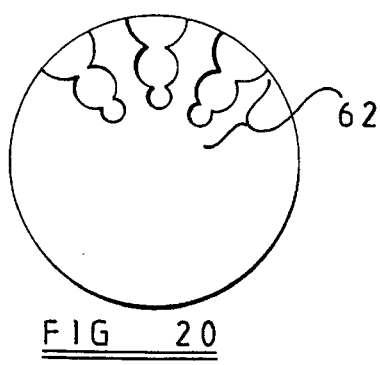

In FIG. 18 there are provided three ribs 58 extending outwardly away from an inner area 59, each rib 58 comprising three separate circular projections formed on the rear surface of the front table. The projections, three in the present case, increase in depth and diameter as they extend outwardly away from the inner area 59. FIG. 19 shows a somewhat similar arrangement where the circular projections in each rib 60 are connected by bridging portions 61. In the alternative arrangement shown in FIG. 20, in each rib 62 the projections on the rear surface of the front table, of increasing diameter, are shaped to flow into one another to form a continuous rib.

Figure 21:
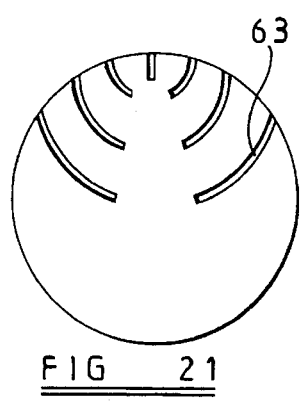

FIG. 21 shows an arrangement which is somewhat similar to the arrangement of FIG. 11, except that the arcuate ribs 3 are curved in the opposite direction.

Figure 22:
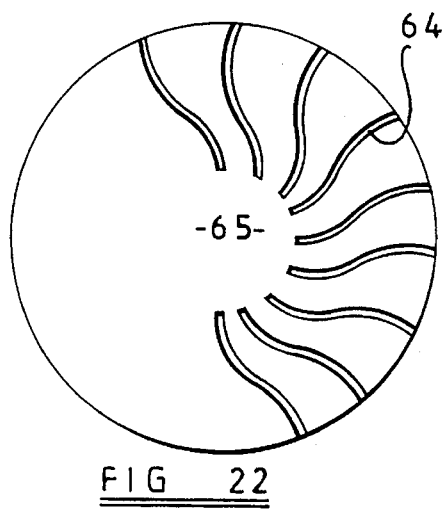

In FIG. 22 the ribs 64 (only some of which are shown) are spaced equally apart around a circular inner area 65 and extend to the outer periphery of the element. Each rib 64 is in the form of an elongate S-shape.

Figure 23:
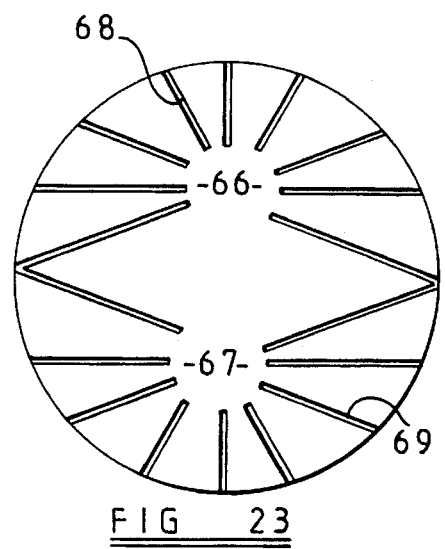

In the arrangement of FIG. 23 there are provided two spaced circular inner areas 66 and 67 of the front table, from which extend straight ribs 68 and 69 respectively. The two inner areas 66, 67 are spaced apart along a diameter of the element and the outer extremities of the ribs 68 and 69 are spaced equally apart around the periphery of the element.

Figure 24:
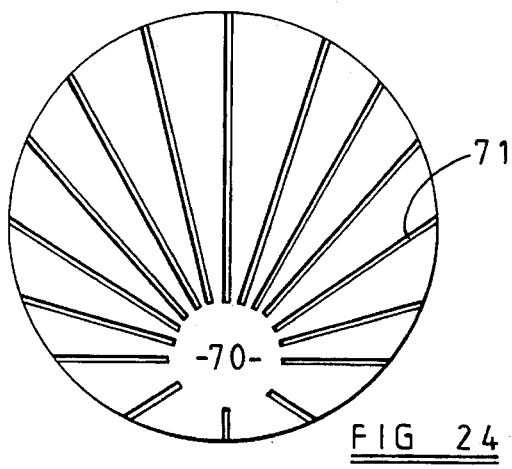

In FIG. 24 there is a single circular inner area 70 which is asymmetrically disposed with respect to the front table. Straight ribs 71 extend from the outer periphery of the inner area 70 to the outer periphery of the front table. The angular separation of the ribs 71 varies so that the outer extremities of the ribs are equally spaced apart around the outer periphery of the element.

Figure 25:
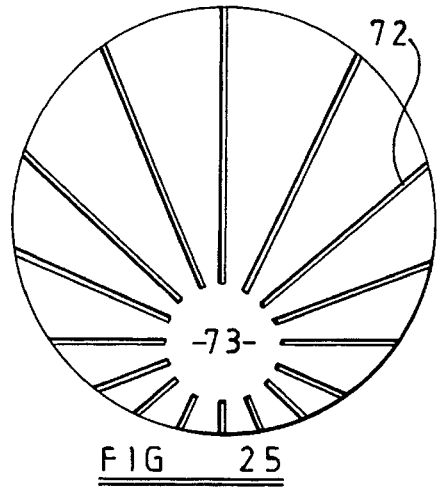

FIG. 25 shows a somewhat similar arrangement in which straight ribs 72 extend from a circular inner area 73. In this case, however, the ribs 72 are spaced at equal angles around the inner area 73.

Figure 26:
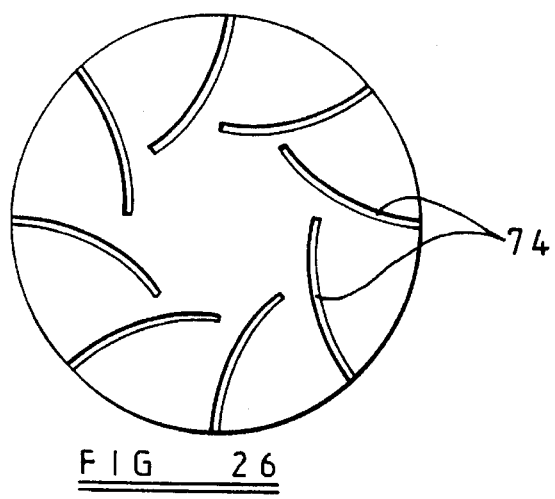
Figure 27:
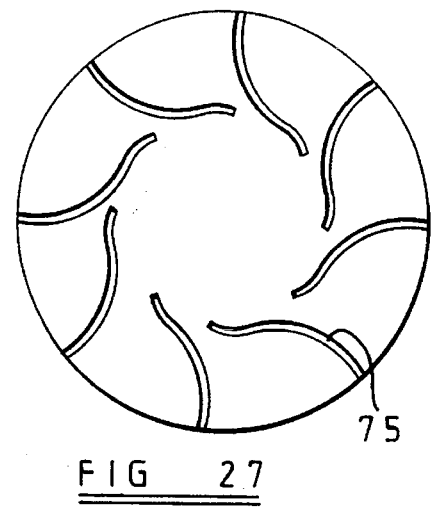

The arrangement of FIG. 26 is somewhat similar to the arrangements of FIGS. 6 and 8 but in this case the ribs 74 are arcuate instead of being straight. The arcuate ribs 74 are preferably so arranged that they intersect the periphery at 90°. FIG. 27 shows an arrangement which is similar to that of FIG. 26 except that the ribs 75 in this case are slightly elongate S-shaped in form.

Figure 28:
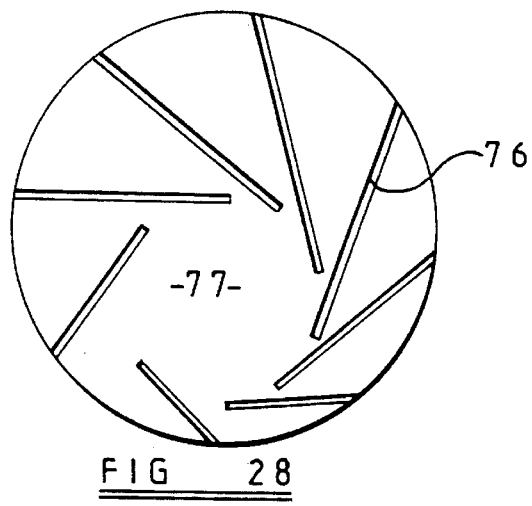
Figure 29:
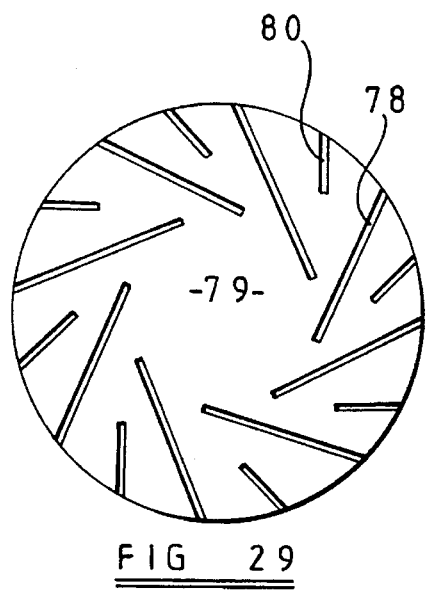

FIG. 28 shows a modification of the offset arrangement of FIG. 24 in which the ribs 76 extend tangentially to the periphery of the circular inner area 77. FIG. 29 shows a further modification of this arrangement in which main long ribs 78 extend tangentially from the periphery of the circular inner area 79, and shorter angled ribs 80 are spaced between adjacent longer ribs 78.

In many of the arrangements described above the rib which are integrally moulded on the rear surface of the front table of the cutting element, are represented diagrammatically by simple lines. In all of the arrangements, however, the ribs may be parallel-sided or may vary in width along their length, for example they may be tapered inwardly or outwardly with respect to the axis of the cutting element. The ribs may also vary in depth along their length and preferably are generally deeper towards the periphery of the cutting element so as to provide improved locking between the front table and the substrate nearer the periphery of the element. For example they may increase linearly in depth as shown in the examples of FIGS. 6–9. The ribs may also vary in shape as viewed in cross-section. For example they may be parallel sided in cross-section, with a rounded lower edge or they may be tapered inwardly or outwardly as they extend downwardly into the substrate.

We claim:

1. A preform element including a facing table of superhard material having a front face, a peripheral surface, and a rear surface bonded to a substrate which is less hard than the superhard material, the rear surface of the facing table being integrally formed with a plurality of ribs which project into the substrate and extend in directions outwardly away from an inner area of the facing table towards the peripheral surface thereof, at least part of the outer peripheral surface of the facing table being formed with a peripheral wall portion which projects rearwardly from the periphery of the facing table, and the outer ends of at least some of the aforesaid ribs intersecting the peripheral wall portion.

2. A preform element according to claim 1, wherein said inner area of the facing table is substantially free of ribs.

3. A preform element according to claim 2, wherein said inner area of the facing table is substantially flat.

4. A preform element according to claim 2, wherein said inner area is a generally circular area within the facing table, said ribs extending outwardly from the periphery of the circular area.

5. A preform element according to claim 1, wherein said inner area of the facing table is substantially coaxial with the facing table.

6. A preform element according to claim 1, wherein said inner area of the facing table is offset with respect to the central axis of the facing table.

7. A preform element according to claim 1, wherein the ribs are spaced apart to form an array which extends around substantially the whole circumference of the facing table.

8. A preform element according to claim 1, wherein the ribs are spaced apart to form an array which extends around only a part of the circumference of the facing table.

9. A preform element according to claim 1, wherein the ribs extend in generally radial directions.

10. A preform element according to claim 1, wherein each rib is inclined at an angle to a radius of the facing table.

11. A preform element according to claim 10, and wherein the ribs are spaced apart to form an array which extends around at least a part of the circumference of the facing table, wherein the ribs are inclined at equal angles to correspondingly associated radii of the facing table.

12. A preform element according to claim 1, wherein the depth of each such rib, where it intersects the peripheral wall portion, is greater than the depth of the wall portion.

13. A preform element according to claim 1, wherein at least some of the ribs vary in depth along the length thereof.

14. A preform element according to claim 13, wherein at least some of the ribs increase in depth as they extend away from the inner area of the facing table.

15. A preform element according to claim 1, wherein the ribs are of similar overall depth.

16. A preform element according to claim 1, wherein the depth of the ribs varies from one rib to another.

17. A preform element according to claim 1, wherein the ribs are of similar lengths.

18. A preform element according to claim 1, wherein each rib tapers in width as it extends outwardly away from said inner area of the facing table.

19. A preform element according to claim 1, wherein the depth of the ribs varies from one rib to another.

20. A preform element including a facing table of superhard material having a front face, a peripheral surface, and a rear surface bonded to a substrate which is less hard than the superhard material, the rear surface of the facing table being integrally formed with a plurality of ribs which project into the substrate and extend in directions outwardly away from an inner area of the facing table towards the peripheral surface thereof, each rib having an inner end and an outer end which is nearer the peripheral surface of the facing table than the inner end, and it central longitudinal axis which is inclined at an angle greater than 0° to the central longitudinal axis of an adjacent rib and is also inclined at an angle greater than 0° to an associated radius of the facing table which intersects said axis at the outer end of the rib.

21. A preform element according to claim 20, wherein the ribs are inclined at equal angles to their respective associated radii of the facing table.

22. A preform element according to claim 20, wherein said inner area of the facing table is substantially free of ribs.

23. A preform element according to claim 22, wherein said inner area of the facing table is substantially flat.

24. A preform element according to claim 22 wherein said inner area is a generally circular area within the facing table, said ribs extending outwardly from the periphery of the circular area.

25. A preform element according to claim 24, wherein said inner area of the facing table is substantially coaxial with the facing table.

26. A preform element according to claim 24, wherein said inner area of the facing table is offset with respect to the central axis of the facing table.

27. A preform element according to claim 20, wherein the ribs are spaced apart to form an array which extends around substantially the whole circumference of the facing table.

28. A preform element according to claim 20, wherein the outer end of at least some of the ribs terminate at or adjacent the peripheral surface of the facing table.

29. A preform element according to claim 20, wherein at least some of the ribs increase in depth as they extend away from the inner area of the facing table.

30. A perform element according to claim 20, wherein the depth of the ribs varies from one rib to another.

31. A preform element according to claim 20, wherein the ribs are of similar lengths.

32. A preform element according to claim 20, wherein each rib tapers in width as it extends outwardly away from said inner area of the facing table.

33. A preform element including a facing table of superhard material having a front face, a peripheral surface, and a rear surface bonded to a substrate which is less hard than the superhard material, the rear surface of the facing table being integrally formed with a plurality of ribs which project into the substrate and extend in directions outwardly away from an inner area of the facing table towards the peripheral surface thereof, each rib extending only part way across the facing table and having an outer end adjacent the peripheral surface of the facing table and an inner end spaced from said peripheral surface and disposed within an inner area of the facing table, said ribs being spaced apart to form an array which extends around less than half of the circumference of the facing table.

34. A preform element according to claim 33, wherein the ribs extend in generally radial directions.

35. A preform element according to claim 33, wherein at least some of the ribs increase in depth as they extend away from the inner area of the facing table.

36. A preform element according to claim 33, wherein each rib tapers in width as it extends outwardly away from said inner area of the facing table.

37. A preform element including a facing table of superhard material having a front face, a peripheral surface, and a rear surface bonded to a substrate which is less hard than the superhard material, the rear surface of the facing table being integrally formed with a plurality of ribs which project into the substrate and extend in directions outwardly away from an inner area of the facing table towards the peripheral surface thereof, wherein each rib comprises a plurality of discrete projections formed on the rear surface of the facing table so as to project into the substrate, said projections being spaced apart along a line which extends outwardly away from said inner area of the facing table towards the peripheral surface thereof, wherein at least some of the ribs increase in depth as they extend away from the inner area of the facing table and wherein the variation in depth of the rib along its length is provided by different projections in the rib being of different depths.

* * * * *